United States Patent [19]

Holp

[11] 4,173,912

[45] Nov. 13, 1979

[54] FABRIC TRIMMER

[75] Inventor: Dennis Holp, Fort Wayne, Ind.

[73] Assignee: The B. F. Goodrich Company, Akron, Ohio

[21] Appl. No.: 934,928

[22] Filed: Aug. 18, 1978

[51] Int. Cl.² .......................... B26D 1/02; B29H 3/06; B29H 9/04
[52] U.S. Cl. ......................................... 83/433; 83/368; 83/425.2; 83/437
[58] Field of Search .............. 83/368, 433, 425, 425.2, 83/426, 437

[56] References Cited

U.S. PATENT DOCUMENTS

| | | | |
|---|---|---|---|
| 2,987,948 | 6/1961 | Casullo | 83/433 X |
| 3,008,864 | 11/1961 | Macklem et al. | 83/433 X |
| 3,238,831 | 3/1966 | Porter | 83/433 |

*Primary Examiner*—Donald R. Schran
*Attorney, Agent, or Firm*—Joseph Januszkiewicz

[57] ABSTRACT

An adjustable edge trimmer for removing the marginal excess of rubber from a longitudinally moving sheet of elastomeric material. The edge trimmer is biased into contact with the moving fabric and is free to follow the cord edge while maintaining the same cutting pressure in its movement. The cutting angle is independently adjustable irrespective of the transverse slant of the carriage that carries the edge trim cutter.

8 Claims, 9 Drawing Figures

FABRIC TRIMMER

BACKGROUND OF THE INVENTION

This invention relates to a trimmer and more particularly to an edge gum trimmer unit for use in trimming side edges of excess rubber from rubber coated fabric.

In applying a thin coat of rubber onto moving parallel strands of fabric by means of calender rolls, a surplus of rubber is used to assure the coating of the entire width of the fabric including the side marginal edges. In order to provide a finished coated fabric which requires cutting and the subsequent splicing of the side edges to fabricate the bias ply fabric, the calendered ply stock of coated fabric must have its parallel side edges trimmed cleanly and evenly close to edge cords to assure a consistent spacing of rubber and the strands of fabric. In calendering fabric, there is a tendency for the edge cords to spread or move apart from their initial position. In addition, there is a tendency for the fabric along with its cords to shift as a unit laterally as it is unwound from a supply roll. Efforts to obtain a smooth, evenly coated edge have included sensing means to position the edge trimmer as in U.S. Pat. No. 3,008,864, however, there is a lag in the response of controls that can magnify the amount of edge gum. U.S. Pat. No. 3,238,831 has applied to a lateral pressure to the knife to maintain an even pressure. The present invention is an improvement over the latter patent by providing a structure which compensates for the angular adjustment of the guide rods for the carriage which carries the trimming knives to assure for a cut that is normal to the surface of the fabric even though the trim knife is biased downwardly toward the lateral edge to be trimmed.

SUMMARY OF THE INVENTION

The present invention contemplates an edge trimmer for attachment to a calendering apparatus, wherein the trimmer has a support frame with parallel rods that can be adjusted to provide an incline to a crosshead mounted thereon. The degree of inclination determines the bias to the edge trimmer. A knife and tool holder are pivotally mounted on the crosshead with an adjusting device interposed therebetween to compensate for any angular inclination of the knife due to the angular inclination of the crosshead that supports the tool holder.

DETAILED DESCRIPTION

Figure 1:
FIG. 1 is a diagrammatic cross section of the rubberized fabric.
Figure 2:
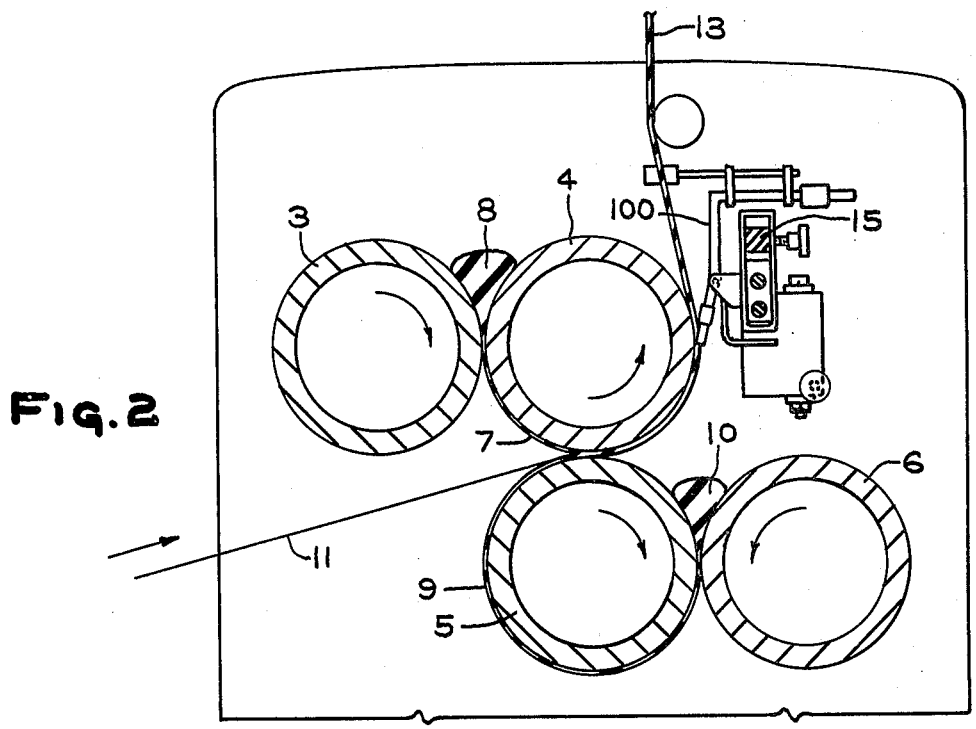
FIG. 2 is a diagrammatic cross-sectional view of a conventional four-roll calender machine showing an edge trimmer generally.

Referring to the drawings wherein like reference numerals designate like or corresponding parts throughout the several views, there is shown in FIG. 2 a calendering apparatus designated 1 having spaced vertically extending standards which support calender rolls 3, 4, 5 and 6. A sheet of rubber 7 is formed on the roll 4 from a bank of stock 8 between rolls 3 and 4. A sheet of rubber 9 is formed on roll 5 from a bank of rubber 10 between rolls 5 and 6. Suitable means not shown direct suitably spaced strands of material (nylon, cotton, wire or other suitable tire cord materials) designated 11 that have been suitably dipped in specially formulated liquid rubber compounds and tension dried, to the bight portion of rolls 4 and 5. The calender rolls 3 through 6 are so spaced as to calender sheets 7 and 9 to a precise thickness so that when the sheets are brought together onto the moving strands of cord 11, rubber compound 12 is forced between the strands 11 to make a rubberized coated fabric 13. Fabric 13 as shown in FIG. 1 comprises individual strands of cord 11 and a homogeneous rubber coating 12 around and between the cords due the pressure of the calender rolls.

As the fabric 13 emerges from the calender rolls a pair of laterally spaced trimms 14, 14' mounted on a spacer bars 15 and 16 respectively operate to trim the respective laterally spaced edges of the fabric 13 to provide a rubberized fabric 13 that has the respective side edges trimmed cleanly and closely to the adjacent edge cords 11.

The respective edge trimmers 14 and 14' are similar in all respects except for being of opposite hand, and only one will be described. The spacer bar 15 which supports edge trimmer 14 is pivotally mounted on a pair of spaced brackets 17 and 18 (FIG. 4) that are suitably connected to standard 2. Bracket 18 has an abutment 19 located on the intermediate portion thereof. Spacer bar 15 has a leg portion 20 that is received by the spaced brackets 17 and 18, with a bore 21 extending vertically therethrough. Bore 21 of leg portion 20 is in alignment with bores 22 and 23 of brackets 17 and 18 respectively, receiving a hinge pin 25. The lower end portion of leg portion 20 is chamfered as at 26. A threaded bore 27 extends through chamfered portion 26 to receive threaded screw 28 which engages abutment 19 and will hold the spacer bar 15 and the edge trimmer 14 along with its knife in position for removal of the excess rubber from the marginal edges of the fabric. Screw 28 has a knob 24 suitably connected thereto for rotating such screw 28 to lock or unlock the edge trimmers in position on the spacer bar 15.

The edge trimmer 14 comprises an upper support bar 30 and a lower support bar 31 suitably connected at their respective end portions by pairs of laterally spaced vertically extending braces 32, 32' and 33, 33'. The upper end portions of the respective braces 32, 32' and 33, 33' rotatably support roller units 34 and 35. The roller units 34 and 35 are in rolling contact with the spacer bar 15 such that the edge trimmer 14 may be adjusted thereon. In order to lock the edge trimmer 14 onto bar 15, lock means 36 is mounted on the vertical extending brace 32'. Brace 32' has a boss 37 suitably mounted on the upper end portion thereof. Boss 37 has a threaded bore in alignment with a threaded bore 39 on brace 32' to thereby accommodate a lock screw 40. One end of lock screw 40 has a handle 42 secured thereto for rotating such lock screw 40. The other end of screw 40 may support a pressure plate which operates to release or exert pressure onto bar 15 to thereby accommodate the locking of edge trimmer 14 thereon.

Figure 4:
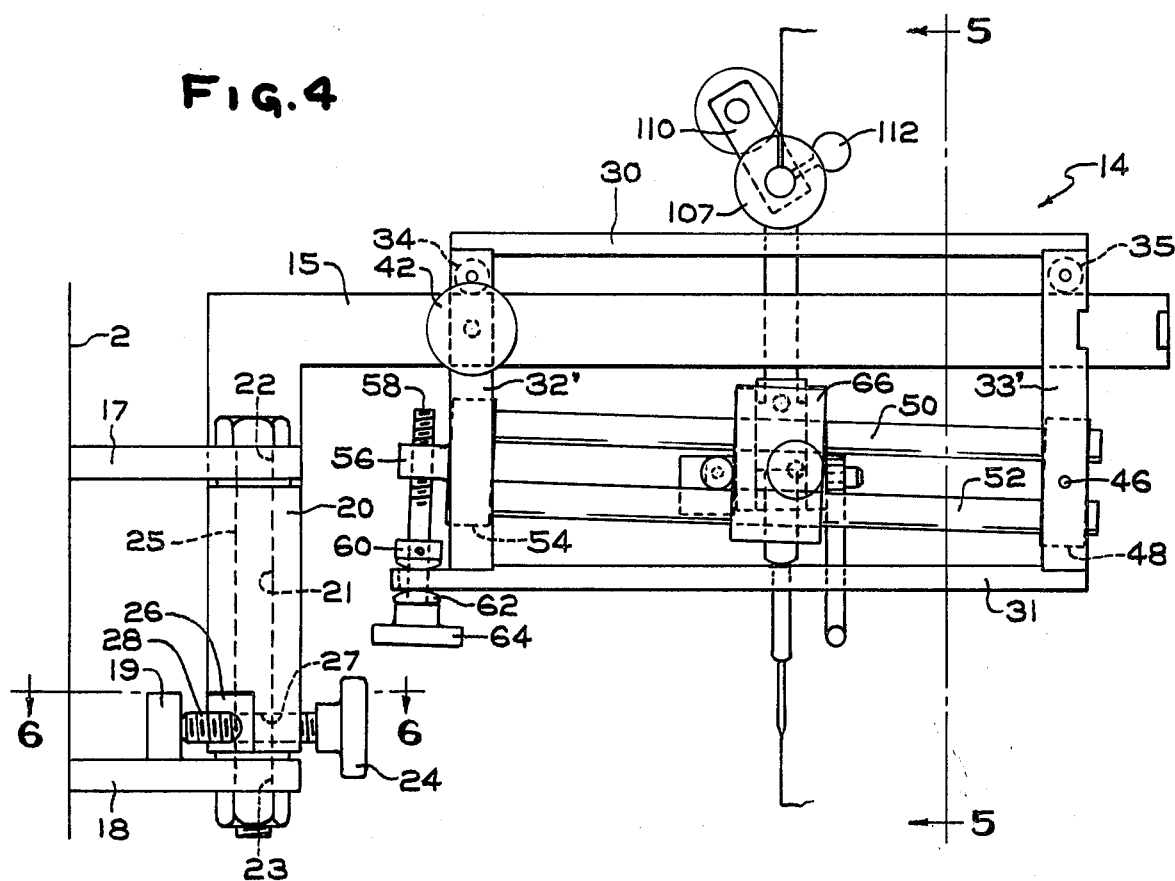
FIG. 4 is an enlarged front elevational view of the edge trimmer.
Figure 5:
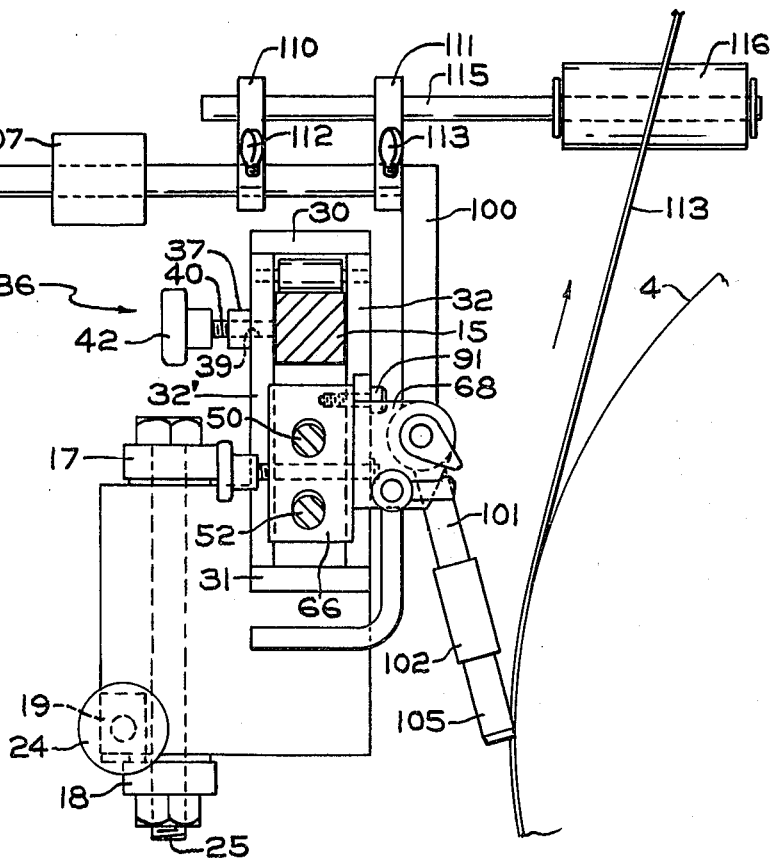
FIG. 5 is a cross-sectional view of the edge trimmer taken along line 5—5 of FIG. 4.
Figure 6:
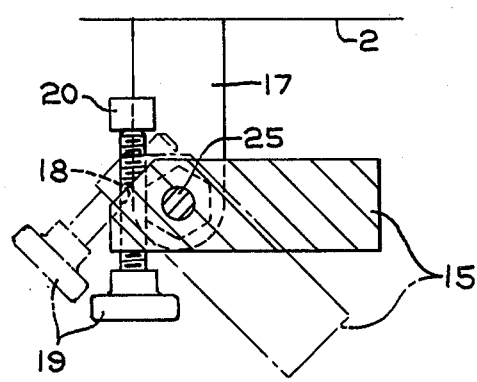
FIG. 6 is a cross-sectional view of the edge trimmer taken along line 6—6 of FIG. 4.

As shown in FIG. 4, mounted in the lower end portions of braces 33 and 33', is a support shaft 46 which pivotally supports a rectangular shaped support block 48. Block 48 has a pair of vertically spaced bores, which bores receive respectively one end of generally horizontally extending rods 50 and 52. The other end of rods 50 and 52 are connected to a vertically adjustable block 54. Block 54 has a laterally extending projection 56 which threadedly receives an adjusting screw 58. Screw 58 has its lower end extending through vertically spaced cam members 60 and 62 and connected to a handle 64 for rotation thereof. Cam members 60 and 62 abuttingly contact lower support bar 31, such that rotation of screw 58 operates to raise or lower block 54 and thereby impart the desired degree of slant or inclination to the rods 50 and 52.

Figure 9:
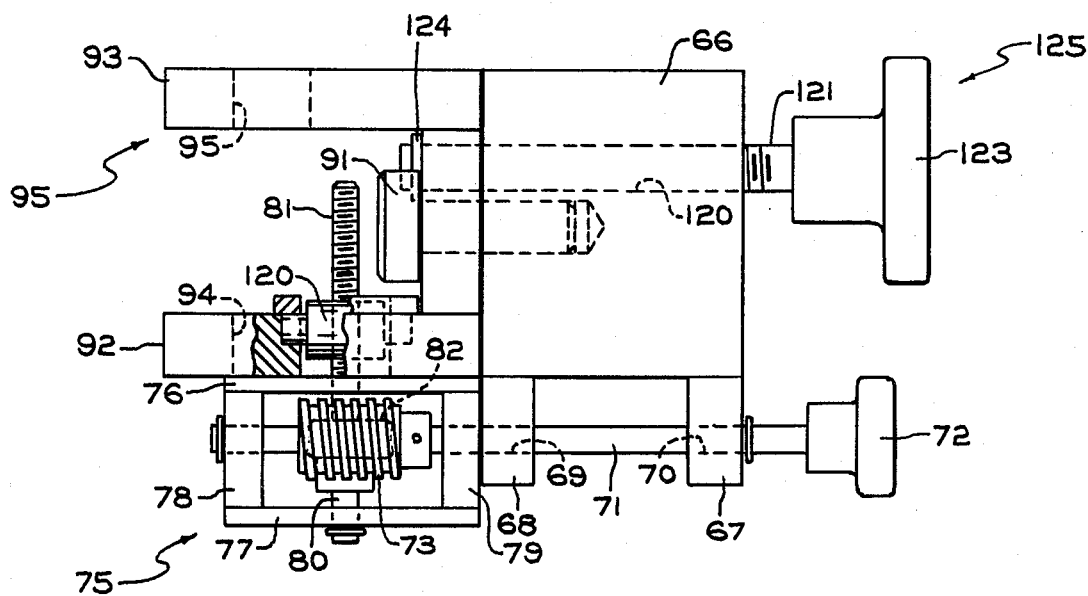
FIG. 9 is a fragmentary plan view of the tool holder and adjusting device.

Slidably mounted on rods 50 and 52 for movement in a rectilinear direction is a crosshead or carriage 66. Crosshead 66 is adapted to slide on rods 50 and 52 on steel ball bushings for unrestricted movement between the limits of the vertically extending braces 32 and 33. Cam members 60 and 62 along with screw 58 and handle 64 operate as an adjusting means on the support frame to adjust the crosshead 66 on the rods 50 and 52. Crosshead 66 has a pair of laterally spaced hubs 67 and 68 (FIG. 9) with aligned bores 69 and 70, having a handle 72 on one end and a worm shaft 73 suitably secured thereto at the other end. A box-like frame 75 encompasses the worm shaft 73 and journals the other end portion of shaft 71. Rotation of shaft 71 rotates worm shaft 73 in the box-like frame 75 which has two side walls 76, 77 and two end walls 78, 79. End walls 78, 79 journals for rotation a shaft 80 which has one end portion threaded as at 81. Shaft 80 has a worm gear 82 suitably keyed thereto, which worm gear 82 meshes with worm shaft 73 for rotation thereby.

Figure 7:
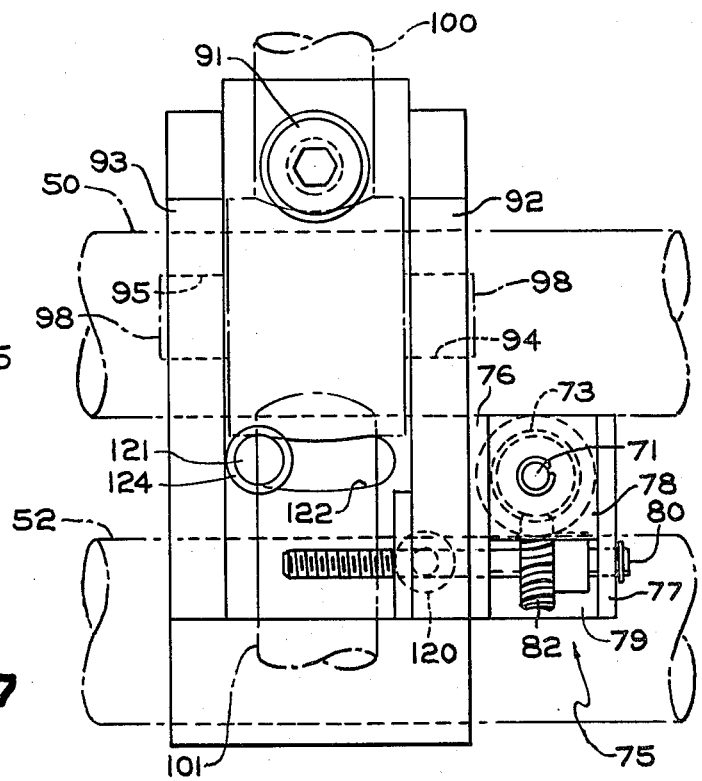
FIG. 7 is a fragmentary front elevational view of the trimming tool knife holder and adjusting device.
Figure 8:
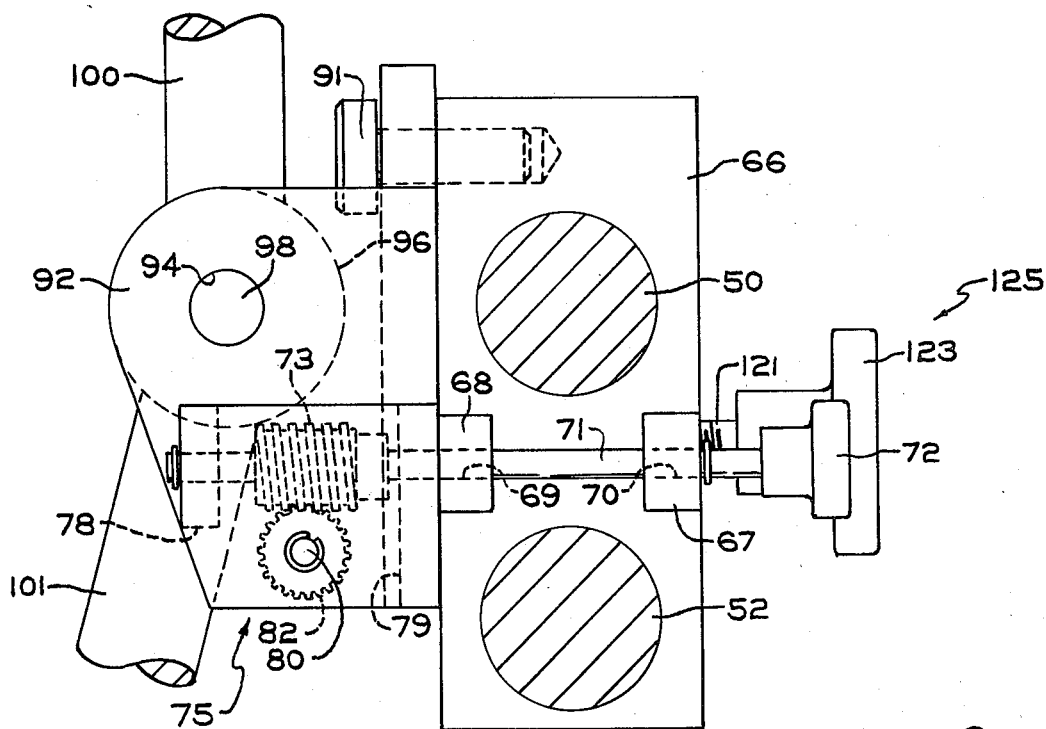
FIG. 8 is a fragmentary side elevational view of the trimming tool knife holder, adjusting device and a portion of the crosshead.

A U-shaped cutter support 90 is pivotally secured as by a pivot screw 91 to crosshead or carriage 66. Cutter support 90 has a pair of spaced side members 92 and 93 with aligned bores 94 and 95 respectively. A tool holder 96 with laterally extending rods 98 and 99 (FIG. 7) received by bores 94 and 95 respectively is mounted on U-shaped cutter support 90. Tool holder 96 has an upwardly extending arm member 100 and a downwardly extending arm member 101. Arm member 101 has an enlarged portion 102 which is suitably recessed to receive the end of a cutter bit or knife 105 which is adapted to trim the excess rubber from the marginal edges of the fabric 13. The upwardly extending arm member 100 has a horizontally shaped portion 106 with a weight 107 adjustably secured thereto as by a set screw. A pair of bracket 110 and 111 are suitably adjustably mounted on arm member 100 by wing nuts 112 and 113. Brackets 110 and 111 have aligned bores to receive a shaft 115 which has journaled on one end thereof a roller 116 which is adapted to engage the marginal edge of fabric 13.

The side member 92 of U-shaped cutter or tool support 90 has a treaded nut 120 seated therein, which nut 120 is threadedly engaged by the threaded portion 81 of shaft 80. Such shaft 71 along with worm shaft 73, shaft 80, worm shaft 73 and worm gear 82 operate as a gear train to adjust tool holder 96 in cooperation with threaded nut 120. This operates as an adjusting device to pivot the tool holder 96 in on the pivot screw 91 to adjust the inclination of the knife 105 to compensate for the angular inclination of crosshead 66 on rods 50 and 52.

Figure 3:
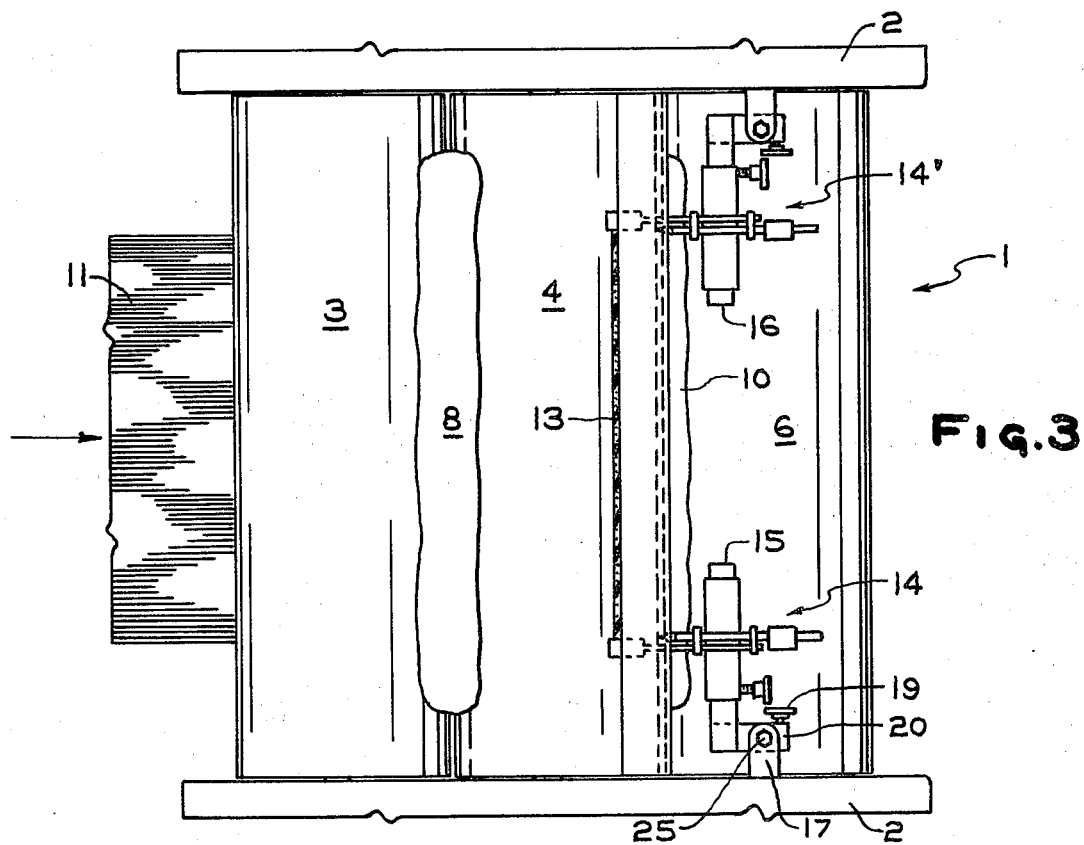
FIG. 3 is a diagrammatic plan view of a calender machine showing a pair of laterally spaced edge trimmers mounted thereon.

Crosshead 66 has threaded bore 120 which receives a threaded rod 121 therein. The one end portion of rod 121 is received by a arcuate slot 122 in the U-shaped cutter support 90. The other end portion of rod 121 has a handle 123 keyed or otherwise connected to the rod 121 to effect rotation thereof. The one end portion of rod 121 has an annular washer 124 suitably secured thereto, such that rotation in one direction of handle 123 will bias washer 124 into locking engagement with the U-shaped cutter support 90 and in effect lock the tool holder in its adjusted position for operation on the fabric whereas rotation of rod 121 in the opposite direction will unlock the cutter support 90. In effect, the threaded rod 121 along with washer 124, handle 123 and arcuate slot 122 in cutter support 90 operates as a lock means 125 for the tool holder 96. In the operation of the edge trimmers 14 and 14', assume a continuously moving sheet of rubberized fabric 13 coming from calender apparatus 1 with edge trimmers 14 and 14' operating on the respective edges of such fabric 13. Since the edge trimmers 14 and 14' are similar in all respects except being of opposite hand, only the operation of edge trimmer 14 will be described. Initially, handle 42 of lock means 36 is rotated to release its lock on the spacer bar 14 to permit manual rectilinear movement of edge trimmer 14 to its desired location of operation. Handle 42 is then rotated to lock the edge trimmer in position on bar 15. Thereafter, crosshead 66 is positioned by inclining rods 50 and 52. Handle 64 is rotated to move block 54 vertically upward which as viewed in FIG. 4 slants rods 50 and 52 downward from left to right. Such elevation of rods 50 and 52 causes crosshead 66 to slide from left to right as viewed in FIG. 4, and to slide towards the longitudinal center line of sheet fabric 13 as viewed in FIG. 3. The cutter support 90 with knife 105 is positioned adjacent to the outer strand of cord such that the slant of the rods 50 and 52 maintains sufficient lateral pressure on the knife 105 to cut evenly the rubberized edge adjacent the outer strand of cord. The counterweight 107 is adjusted on arm portion 106 to provide the necessary cutting pressure on knife 105. In addition guide roller 116 is adjusted via wing nuts 112 and 113 to assist the cutting or trimming knife 105 to track along the outside cord of the marginal edge of the fabric 13. In this position of knife 105, the cutting edge of the knife will assume an altitude as determined by the slant of rods 50 and 52 which can be at an angle relative to cords or the longitudinal center line of the fabric 13. To compensate for this angular disposition of the knife 105, the operator unlock lock means 125 and then rotates handle 72 which in turn rotates worm shaft 73 and worm gear 82 which in turn rotates shaft 80 which via threaded end 81 to pivot threaded nut 120 along with side wall 92 and the cutter support 90 bodily about pivot screw 91, thereby aligning the knife edge of knife 105 to perform a cut that is parallel to the cords thereby insuring that the rubber left on the marginal edges of the fabric 13 will be consistent in quantity to assure an excellent splice between cut sections of fabric when they are spliced together to form the overhead ply. Lock means 125 is then operated to lock the tool holder and knife 105 in position. The entire edge trimmer 14 and 14' can be moved away from the calender rolls by loosening screw 19 and swinging the edge trimmer 14 and bar 15 outwardly away from the roll 4.

Obviously, many modifications and variations of the present invention are possible in the light of the above teachings. It is therefore to be understood that within the scope of the appended claims, the invention may be practiced otherwise than as specifically described.

I claim:

1. An edge gum trimmer comprising a support frame adapted to be connected to a calender apparatus which processes a sheet of continuously moving fabric material having parallel strands of cords and with such fabric having a longitudinal center line, said support frame having a pair of parallel guide rods mounted thereon said rods lying in a plane that is normal to said longitudinal center line, adjusting means on said support frame operatively engaging said pair of guide rods for adjusting the inclination of said rods relative to a horizontal plane, a crosshead slidably mounted on said guide rods, a tool holder, pivot means interconnecting said tool holder and said crosshead, a trimming knife mounted on said tool holder, an adjusting device mounted on said crosshead and operatively connected to said tool holder for pivoting said tool holder and said knife about said pivot means to align said trimming knife relative to said longitudinal center line.

2. An edge trimmer as set forth in claim 1 wherein said adjusting device has a gear train interconnecting said tool holder and said crosshead and being operative for pivoting said tool holder and knife relative to said crosshead.

3. An edge trimmer as set forth in claim 2 wherein said cross head has a laterally extending arm with a guide roll thereon for contacting the marginal edge of fabric.

4. An edge trimmer as set forth in claim 3 wherein said support frame of said edge trimmer has a release pivot means interconnecting said support frame to said calender for pivoting said edge trimmer away from said calender.

5. An edge trimmer for rubberized fabric comprising a horizontally extending crossbar pivotally connected to a calender apparatus, means for securing said crossbar to said calender apparatus to prevent movement relative to said calender apparatus, a support frame mounted on said crossbar for linear adjustable movement thereon, a first block pivotally mounted on one end of said support frame, a second block mounted on the other end of support frame for movement in a rectilinear vertical direction, adjusting means on said support frame operatively connected to said second block for adjusting said second block in a vertical rectilinear direction, guide bars interconnecting said first and said second block whereby said guide bars assume a slant in accordance with the direction of movement of said second block relative to said first block, a crosshead slidably mounted on said guide bars for unrestricted rectilinear movement thereon, a tool holder mounted on said crosshead for pivotal adjustment about an axis that is generally normal to the plane of fabric immediately being trimmed, a trimming knife secured to said tool holder for adjustment therewith, an adjusting device mounted on said crosshead and operatively connected to said tool holder for adjustably moving said tool holder about the pivotal axis mounting of said tool holder on said crosshead.

6. An edge trimmer as set forth in claim 5 wherein said adjusting device includes a support member having a feed screw journaled therein for rotation, means mounted on said crosshead for rotating said feed screw, and said feed screw threadedly engaged with a nut securely held by said tool holder.

7. An edge trimmer as set forth in claim 6 wherein said tool holder has an upwardly extending arm member, and an adjustable weight mounted on said arm member for biasing said trimming knife into contact with the rubberized fabric edge.

8. An edge trimmer as set forth in claim 7 wherein roller guide means are mounted on said arm member for rolling contact with a marginal edge of the rubberized fabric.

* * * * *